United States Patent
Moreau

(10) Patent No.: US 6,395,069 B1
(45) Date of Patent: May 28, 2002

(54) AQUEOUS SOLUTION WHICH CAN BE USED IN AN ION-EXCHANGE PROCESS

(75) Inventor: Serge Moreau, Velizy Villacoublay (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 46 days.

(21) Appl. No.: 09/597,896

(22) Filed: Jun. 19, 2000

(30) Foreign Application Priority Data

Jun. 18, 1999 (FR) .............................................. 99 07739

(51) Int. Cl.$^7$ ............................................... B01D 53/04
(52) U.S. Cl. ............................... 95/96; 95/114; 95/116; 95/902; 423/715; 423/332; 502/79
(58) Field of Search ...................... 95/130, 902, 96–98, 95/100–106, 114, 115, 116; 423/328.1, 328.2, 332, 700, 713, 714, 715; 502/79, 85

(56) References Cited

U.S. PATENT DOCUMENTS

| | | | | |
|---|---|---|---|---|
| 5,171,333 A | * | 12/1992 | Maurer ...................... | 95/902 X |
| 5,206,195 A | | 4/1993 | Ando et al. .................... | 502/64 |
| 5,258,058 A | * | 11/1993 | Coe et al. .................. | 95/902 X |
| 5,419,891 A | * | 5/1995 | Coe et al. .................. | 502/79 X |
| 5,868,818 A | * | 2/1999 | Ogawa et al. ............. | 95/902 X |
| 6,068,678 A | * | 5/2000 | Labasque et al. ......... | 95/902 X |
| 6,087,514 A | * | 7/2000 | Thangaraj et al. ......... | 502/85 X |
| 6,096,194 A | * | 8/2000 | Taybulevskiy et al. ... | 502/79 X |
| 6,136,069 A | * | 10/2000 | MacDougall et al. ..... | 95/902 X |
| 6,143,057 A | * | 11/2000 | Bulow et al. ............. | 95/130 X |
| 6,242,167 B1 | * | 6/2001 | Shackle et al. ........... | 502/79 X |

FOREIGN PATENT DOCUMENTS

| | | |
|---|---|---|
| DE | 289 026 | 4/1991 |
| DE | 289 027 | 4/1991 |
| EP | 0 785 170 | 7/1997 |
| EP | 0 893 157 | 1/1999 |

* cited by examiner

*Primary Examiner*—Robert H. Spitzer
(74) *Attorney, Agent, or Firm*—Young & Thompson

(57) ABSTRACT

An aqueous solution with a pH of greater than 5, preferably of at least 6.5, can be used in an ion-exchange process, in particular a process for the manufacture of a zeolite. This aqueous solution comprises metal cations, such as zinc, and an agent for complexing the metal cations, such as citric acid or a salt of this acid. The proportion of free cations in solution represents from 0.1% to 99%, preferably from 1 to 30%, of the total amount of the metal in the solution. The invention also relates to a process for the manufacture of zeolites X or A employing such an aqueous solution and the use of the zeolites thus obtained for separating, purifying or converting one or more constituents of a gas stream, such as air, synthesis gases or hydrocarbons, in particular olefins, by employing an adsorption process, in particular a PSA, VSA or TSA.

25 Claims, No Drawings

US 6,395,069 B1

AQUEOUS SOLUTION WHICH CAN BE USED IN AN ION-EXCHANGE PROCESS

FIELD OF THE INVENTION

The invention relates to an aqueous solution and to its use in an ion-exchange process for the purpose of manufacturing zeolites exchanged with metal cations, in particular zinc cations.

BACKGROUND OF THE INVENTION

Gases and gas mixtures have applications in numerous industrial fields. Thus, the gases of the air, such as, in particular, oxygen and nitrogen, are commonly used in numerous fields, such as electronics, combustion, medicine, foodstuffs, welding, and the like. In addition, it is the same for other gases and gas mixtures, such as synthesis gases, also known as "syngases", or hydrocarbons, such as, in particular, olefins.

One of the techniques currently used to produce or purify gases, in particular gases of the air, is the technique referred to as PSA (for Pressure Swing Adsorption), which technique encompasses not only PSA processes proper but also analogous processes, such as VPSA or VSA (Vacuum "Pressure" Swing Adsorption), TSA (Temperature Swing Adsorption) or MPSA (Mixed Pressure Swing Adsorption) processes.

According to this PSA technique, when the gas mixture to be separated is, for example, air and when the component to be recovered is oxygen, oxygen is separated from the gas mixture by virtue of Preferential adsorption of at least nitrogen on one or more materials which preferentially adsorb at least nitrogen and are subjected to cycles of given pressure in the separation region. Oxygen, which is not adsorbed or only slightly adsorbed, is recovered at the outlet of the separation region with a purity generally of greater than 90%, indeed even of greater than 93%.

More generally, a PSA process for the separation of a gas mixture comprising a first compound which is adsorbed preferentially on an adsorbent material and a second compound which is adsorbed less preferentially on the adsorbent material than the first compound, for the purpose of the production of the second compound, cyclically comprises:

- a stage of preferential adsorption of at least the first compound on the adsorbent material, at an adsorption pressure referred to as "high pressure", with recovery of at least a portion of the second compound thus produced;
- a stage of recompression of the separation region comprising the adsorbent, by changing from the low pressure to the high pressure.

Similarly, in order to be able to be used industrially, some gases have to be purified beforehand, in particular by adsorption and/or by catalysis, in order to convert, transform or remove some of the compounds or impurities which they comprise.

Thus, atmospheric air is usually freed from all or a portion of the impurities which it comprises, in particular water vapour, carbon dioxide, carbon monoxide, hydrocarbons, nitrogen oxides and hydrogen, before being subjected to subsequent stages of fractionation by cryogenic distillation, in order to prevent these impurities from having a detrimental effect on the performance of the air separation units, in particular the cryogenic distillation columns. The removal of these impurities is usually carried out by means of one or more adsorbents, in particular zeolites, optionally in combination with alumina.

Similarly, it is also known to remove impurities, in particular metal residues, liable to be present in olefins, in order to prevent their degradation or their colouring, it being possible for the removal of these impurities to be carried out, for example, by means of an adsorbent.

It is known that the efficiency of the separation or of the purification of the fluid, in particular of a gas mixture, such as air, depends on numerous parameters, in particular on the composition of the fluid to be treated, on the type of adsorbent material used and on the affinity of the latter for the compounds to be adsorbed or to be converted, on the size of the adsorbent particles, on the composition of these particles and on their arrangement in the adsorption region or regions.

The size of these adsorbent or catalyst particles is generally highly variable, given that the adsorbent can have a size from several $\mu$m (powder) to several mm, and is most often of the order of 1 mm to 3 mm.

Zeolitic materials are currently the most widely used adsorbents in gas separation or purification plants employing an adsorption separation process.

In point of fact, in order to improve the adsorption efficiency, it is conventional to introduce mono-, di- and/or trivalent metal cations into the zeolite particles, for example alkali metal, alkaline earth metal, transition metal and/or lanthanide cations.

These metal cations are usually incorporated during the synthesis of the zeolite particles and/or are subsequently inserted by an ion-exchange technique, that is to say, generally, by bringing the particles of crude zeolite into contact with a solution of one or more metal salts comprising the metal cation or cations to be incorporated in the zeolitic structure and subsequent recovery of the particles of exchanged zeolite, that is to say of zeolite comprising a given amount of metal cations.

The proportion (in %) of metal cations introduced into the zeolitic structure with respect to the total exchange capacity is known as the degree of exchange.

Such zeoliltes are disclosed in particular in the documents EP-A-486,384, EP-A-606,848, EP-A-589,391, EP-A-589,406, EP-A-548,755, U.S. Pat. No. 5,268,023, EP-A-109,063 and EP- A-760,248.

Furthermore, the document U.S. Pat. No. 5,419,891 discloses a zeolite of X type exchanged with lithium and zinc cations which exhibits improved adsorption properties for the separation of polar gases.

According to this document, the ion exchange, which takes place during the process for the manufacture of the zeolitic samples, is carried out with an exchange solution of zinc salts having a concentration of zinc of 0.1 N and a pH of between 5.6 and 7.0.

In point of fact, such exchange conditions cannot be regarded as ideal or at the very least favourable or suited to operation on an industrial scale, because they result in certain problems.

This is because it is known that, in aqueous solution, zinc salts form, with OH$^-$ ions, a hydroxide Zn(OH)$_2$ of low solubility having a solubility product S of $1.8 \times 10^{-14}$.

The solubility product S is defined hereinbelow by the equation (I):

$$S = [Zn^{2+}] * [OH^-] \tag{I}$$

where: $[Zn^{2+}]$ and $[OH^-]$ are the concentrations in mol.liter$^{-1}$ in equilibrium with the precipitate Zn(OH)$_2$.

It is then immediately apparent that Zn(OH)$_2$ can precipitate if the pH exceeds the value of 7.7 and if the concentration of zinc salt exceeds 0.1 N.

It then follows that the examples given in the document U.S. Pat. No. 5,419,891 are carried out under conditions very close to precipitation and are therefore difficult to carry out, in particular, under industrial conditions.

Furthermore, the zeolite exhibits basic properties. For example, an agglomerated zeolite 13x (binder+zeolite), immersed in water, can raise the pH of an aqueous solution to a value which can reach approximately 10.

Bringing an industrial zeolite into contact with a zinc salt solution initially with a pH of about 5.5 to 7 hence necessarily results in an increase in the pH of the solution, the result of which is to precipitate zinc hydroxide, which zinc hydroxide will then seal off the macropores of the zeolite agglomerates and be deposited on the surface of the zeolite crystals.

An important consequence of this phenomenon is that the kinetics of adsorption of the zeolite will then necessarily decrease, due to the presence of this deposit in the activated agglomerates, and the adsorption properties of the zeolite particles thus produced will then also be found to be detrimentally affected thereby.

In attempting to solve this problem of precipitation of $Zn(OH)_2$, it may be envisaged to dilute the saline $ZnCl_2$ solution, so as to eliminate or minimize the precipitation of $Zn(OH)_2$.

However, such a dilution poses the problem of the industrial use of very dilute solutions, that is to say of being able to effectively carry out and control this type of dilution on an industrial scale when very large amounts of solution are needed if it is desired to keep the zinc in solution, that is to say not to exceed the limit value of the solubility product. For example, at pH=9, the concentration of $Zn^{2+}$ must not exceed $1.8 \times 10^{-4}$ N.

Another possible solution for decreasing the precipitation of zinc hydroxide consists in decreasing the pH to values which make it possible to neutralize the alkalinity of the zeolite at the time of the exchange and which result in a final pH in the vicinity of 7.

To do this, it is then essential to observe starting pH values for the saline solution of less than 6, indeed even of less than 5, that is to say to use a very acidic aqueous solution.

For this reason, this method cannot be regarded as entirely satisfactory on an industrial scale as the beads or particles of agglomerated zeolite, which usually have a size of between 1 and 2 mm approximately, cannot be easily penetrated by the acid and the core of the zeolite particle retains a basic pH.

It then follows that the zinc hydroxide precipitates inside the zeolite particles, whereas the surface of the zeolite particles, subjected to a very acidic pH, will, in addition, be degraded, that is to say damaged by the acidity of the solution.

It may be decided, to correct or minimize any precipitation of zinc hydroxide inside the zeolite particles, to acidify the solution even more. In point of fact, this then also results in an additional and inevitable attack on the surface of the zeolite by the $H^+$ ions and thus a significant fall in the adsorption capacities of the finished product. This method is therefore not suitable either.

Furthermore, the publication by W. Lutz et al., J. Chem. Soc. Faraday Trans., 1990, 86(10), 1899–1904, describes the problem related to the precipitation of $Zn(OH)_2$ during the exchange of powdered zeolite of type A and of types and Y and recommends a way of improving the exchange process via dissolution of the zinc salt in 2% aqueous ammonia.

In point of fact, a person skilled in the art immediately understands that this publication cannot be directly adapted to an industrial scale, given that to exchange, with stirring, a powdered monocrystalline zeolite, the particle size of which is of the order of 7 μm, is much easier than to exchange agglomerated beads with a size of the order of 1 mm to 2 mm. This is because, in the second case, diffusion of the reactants into the macropores of the beads is predominant and a concentration gradient appears, which concentrations are not controlled as in the case of a homogeneous suspension of monocrystals.

Furthermore, the use of ammoniacal solutions exhibits obvious disadvantages, related in particular to the working conditions and to pollution of the environment.

SUMMARY OF THE INVENTION

The aim of the present invention is thus to improve the known processes for the manufacture of zeolites by ion exchange.

In other words, the invention is aimed at solving the problem of the precipitation of metal cations, in particular of zinc cations, in an aqueous solution used to introduce metal cations into a zeolitic adsorbent during the implementation of an ion-exchange process.

The present invention thus relates to an aqueous solution which can be used in particular in an ion-exchange process, which has a pH of greater than 5 and which comprises metal cations of at least one metal and at least one agent for complexing the metal cations, in which the proportion of free metal cazions in solution represents from 0.1% to 99% of the total amount of the metal in the solution.

In the context of the invention, the term "free metal cations" is understood to mean all the metal cations not complexed with the complexing agent present in the aqueous solution and the term "total amount of the metal" is understood to mean the sum of all the free metal cations and of all the metal cations complexed with the complexing agent.

According to circumstances, the aqueous solution of the invention can include one or more of the following characteristics:

the proportion of free metal cations in solution represents from 0.1% to 50% of the total amount of the metal in the solution, preferably from 1% to 30%.

the pH is greater than 6; the pH is preferably greater than or equal to 6.5; the pH is preferentially between 7 and 10 approximately.

the total concentration of the metal is at least 0.02 M, preferably at least 0.05 M, preferentially at least 0.15 M.

the metal cations are divalent cations; the metal cations are preferably chosen from the group formed by alkaline earth metal, transition metal and lanthanide cations.

the metal cations are in the soluble salt form, for example in the chloride form.

the metal cations are zinc, nickel or calcium cations, preferably zinc cations.

the complexing agent is an acid according to the Lewis or Brönstedt definition or a salt of such an acid, optionally at least partially dissociated into ions in solution. In particular, the complexing agent is citric acid or a mono-, di- or trisodium salt of citric acid.

the stoichiometric ratio of the proportion (m) of metal cations to the proportion (n) of the complexing agent is m:n, with $m \geq 1$ and/or $n \geq 1$; the ratio m/n is preferably between 0.1 and 3, preferably between 0.5 and 1.

In addition, the invention also relates to an ion-exchange process, in which process an adsorbent material is brought into contact with at least one aqueous solution according to the invention, which solution has a pH of greater than 5 and comprises, in addition, metal cations of at least one metal and at least one agent for complexing the metal cations, so as to bring about incorporation, by ion exchange, of at least a portion of the metal cations in the adsorbent.

According to circumstances, the ion-exchange process of the invention can include one or more of the following characteristics:

- the incorporation by ion exchange is carried out by soaking or by percolation of the adsorbent with the solution.
- the adsorbent is at least one zeolite, preferably agglomerated with at least one binder.
- the adsorbent is at least one zeolite of faujasite (X or LSX) or A type, preferably a faujasite zeolite having an Si/Al ratio of 1 to 1.25.
- the adsorbent material is brought into contact with the aqueous solution at a temperature of between 5° C. and 120° C., preferably of between 20° C. and 100° C., more preferably between 30° C. and 80° C.
- the adsorbent is, in addition, exchanged with cations of at least one second metal, preferably lithium cations, it being possible for this other ion exchange to be carried out prior to and/or subsequent to the ion exchange carried out with the aqueous solution according to the invention.

According to another aspect, the invention also relates to a process for the manufacture of an adsorbent, in particular zeolite particles, employing at least one stage of ion exchange during which the adsorbent is brought into contact with at least one aqueous solution according to the invention, which solution has a pH of greater than 5 and comprises, in addition, metal cations of at least one metal and at least one agent for complexing the metal cations, so as to bring about incorporation, by ion exchange, of at least a portion of the metal cations in the adsorbent according to an on-exchange process according to the invention.

By way of indication, reference may be made to the document EP-A-785,170, incorporated here by reference.

Furthermore, the invention also relates to an adsorbent, preferably in agglomerated form, which is capable of being obtained by an ion-exchange process according to the invention and which comprises metal cations of at least one metal, preferably zinc.

In addition, according to yet another aspect, the invention relates to particles of zeolite X, LSX or A, preferably of zeolite X or LSX, in agglomerated form, which zeolite is exchanged with zinc cations according to an ion-exchange process according to the invention, furthermore comprising lithium cations and optionally comprising from 0.5 to 30% by weight of a binder, in particular of a clay, such as attapulgite, bentonite, kaolin or the like.

Furthermore, the invention also provides a process for the separation or purification by adsorption of a gas mixture employing particles of adsorbent or of zeolite according to the invention, preferably an adsorption process of PSA, TSA or VSA type.

The adsorption process preferably employs at least one adsorber, preferably from 1 to 3 adsorbers, preferentially adsorbers with a radial geometry. In this case, the invention applies to each of the adsorbers of an adsorption process employing several adsorbers.

In addition, according to this adsorption process, the gas mixture is chosen from: a gas mixture comprising essentially nitrogen and oxygen, in particular air; a gas mixture comprising essentially hydrogen and/or carbon monoxide, in particular a synthesis gas; a gas mixture comprising essentially one or more hydrocarbons, in particular one or more olefins; and a gas mixture comprising carbon dioxide and/or water vapour, in particular air.

When the gas stream to be separated comprises nitrogen and at least one less polar gaseous compound, in particular oxygen, the gas stream is then preferably air, the first gaseous compound being nitrogen and the second gaseous compound being oxygen, air being, in the context of the present invention, the air present inside a building or a heated or unheated chamber or external air, that is to say under the conditions of the atmosphere, taken as such or optionally pretreated. In this case, a gas stream is produced which is rich in oxygen, that is to say generally comprising at least approximately 90% of oxygen.

When the gas stream is a synthesis gas, then, in this case, a gas stream is produced which is rich in hydrogen, that is to say generally comprising at least approximately 80% of hydrogen.

In addition, the adsorption process can comprise one or more of the following characteristics:

- the adsorption high pressure is between $10^5$ Pa (1 bar) and $10^7$ Pa (100 bar), preferably of the order of $10^5$ Pa to $3\times10^6$ Pa (30 bar).
- the desorption low pressure is between $10^4$ Pa (0.1 bar) and $10^6$ Pa (10 bar), preferably of the order of $10^4$ Pa (0.1 bar) to $10^5$ Pa (1 bar).
- the temperature of the feed gas is between −50° C. and +200° C., preferably between 10° C. and 80° C., more preferably between 25° C. and 60° C.
- the zeolitic adsorbent material is chosen from faujasites or zeolites A, advantageously a zeolite X having an $Si_i/Al$ ratio equal to approximately 1; such a zeolite is known as a zeolite LSX (Low Silica X) or silica-poor zeolite. Such a zeolite X can comprise at least 80% of $Li^+$ cations, preferably at least 86%, and/or at most 96% of $Li^+$ cations, and/or at most 15% of $Na^+$ cations, preferably at most 14%, more preferably at most 12%, and/or at least 4% of $Na^+$ cations, and/or at most 5% of $Mg^{2+}$ cations, preferably at most 2%, and/or at least 0.1% of $Mg^{2+}$ cations, preferably at least 0.2%, and/or at most 8% of $Ca^{2+}$ cations, preferably at most 5%, and/or at least 0.2% of $Ca^{2+}$, cations, preferably at least 1%, and/or at most 3% of $K^+$ cations, preferably at most 1%, preferentially at most 0.5%.

DETAILED DESCRIPTION OF THE INVENTION

Thee invention will now be described in more detail with the help of an implementational example given by way of illustration but without implied limitation.

EXAMPLE

The present invention is illustrated by a process for the introduction of zinc cations into adsorbent particles of zeolite of type X, that is to say an ion-exchange process, under pH conditions which ensure that the structure of the zeolite is not impaired, prevent the precipitation of the zinc, wherever this is, and make it possible to operate with concentrated ion-exchange solutions.

According to the invention, an exchange solution is used comprising a mild complexing agent for zinc.

For example, use may be made, as mild complexing agent for zinc, of citric acid and more specifically of the citrate ion.

The complexing reaction of zinc with citric acid, that is to say the ligand L, is of 1:1 stoichiometry and can be illustrated as follows:

$$Zn^{2+} + L^{n-} \rightleftharpoons ZnL^{2-n} \tag{III}$$

The equilibrium constant K is:

$$K = \frac{[ZnL^{2-n}]}{[Zn^{2+}]*[L^{n-}]} \tag{III}$$

with, for citric acid: $K=10^{4.6}$.

It should be noted that the more complex reactions with stoichiometries n:m where n and m are integers (with n:m other than 1:1) also form part of the invention.

In point of fact, citric acid (of schematic formula: $LH_3$) is a triacid which has three dissociation stages:

$$LH_3 \rightleftharpoons LH_2^- + H^+, K_1 = 8.2*10^{-4}$$

$$LH_2^- \rightleftharpoons LH^{2-} + H^+, K_2 = 1.8*10^{-5} \tag{IV}$$

$$LH^{2-} \rightleftharpoons L^{3-} + H^+, K_3 = 4.0*10^{-6}$$

It should be noted that compounds exhibiting more or less numerous acidic functional groups also form part of the invention.

When the pH and the total concentration of zinc and of citric acid and citrate ions are known, solving the equations (IV) makes it possible to calculate the concentration of free zinc (in the $Zn^{2+}$ form) in the aqueous solution and thus to test whether the solubility product reaches the critical value.

Furthermore, it is desired to exchange the ions initially present in the zeolite with zinc.

For example, with a zeolite Z comprising sodium $Na_2Z$, there is, during the exchange of the sodium ions with the zinc ions:

$$Zn^{2+} + Na_2Z \rightleftharpoons 2Na^+ + ZnZ \tag{V}$$

Consequently, the conditions which are attached to the complex are to ensure a zinc concentration which is both low enough for the solubility product not to reach the critical value and high enough for the exchange with the cations of the zeolite to be still possible.

This is because a complexing agent which would capture all the zinc ions could no longer allow the zinc to penetrate into the zeolite.

In other words, according to the invention, use is made of a complexing agent for zinc which does not complex all the zinc cations, so that a sufficient fraction of free zinc remains in solution to ensure exchange of ions with the zeolite, under alkalinity conditions compatible with consideration for the zeolite.

By way of example:

a 0.25 M zinc chloride solution is prepared, which solution is brought into contact at 30° C. with anhydrous zeolite LSX in the proportions of 100 g of zeolite per 110 ml of solution. This preparation is known as "Sample No. 1";

a solution is prepared comprising a mixture of 0.25 M zinc chloride and of 0.25 M monosodium citrate, which solution is brought into contact at 30° C. with anhydrous zeolite LSX in the proportions of 100 g of zeolite per 110 ml of solution. This preparation is known as "Sample No. 2";

a solution is prepared comprising a mixture of 0.25 M zinc chloride and of 0.15 M monosodium citrate, which solution is brought into contact at 30° C. with anhydrous zeolite LSX in the proportions of 100 g of zeolite per 110 ml of solution. This preparation is known as "Sample No. 3"; and a solution is prepared comprising a mixture of 0.25 M zinc chloride and of 0.25 M trisodium citrate, which solution is brought into contact at 30° C. with anhydrous zeolite LSX in the proportions of 100 g of zeolite per 110 ml of solution. This preparation is known as "Sample No. 4".

A portion of each solution is periodically withdrawn after homogenization and the amount of residual zinc is determined with regard to the latter.

The results are given in the following table.

TABLE

| Sample No. | Final pH | Content of zinc in the aqueous solution | | | | |
| --- | --- | --- | --- | --- | --- | --- |
| | | Initial | After 0 minutes | After 10 minutes | After 20 minutes | After 60 minutes |
| 1 | 6.98 | 0.25 | 0.11 | 0 | 0 | 0 |
| 2 | 6.26 | 0.25 | 0.17 | 0.11 | 0.11 | 0.11 |
| 3 | 6.26 | 0.25 | 0.16 | 0.08 | 0.08 | 0.07 |
| 4 | 7.12 | 0.25 | 0.23 | 0.22 | 0.22 | 0.21 |

It is found that the exchange of zinc between the solution and zeolite LSX remains possible in the presence of the complexing agent and that the residual level of zinc in the solution can be adjusted as required by varying the type of salt used, the pH and the stoichiometric proportions.

In the absence of salt of citric acid, a copious precipitate of zinc hydroxide is observed, whereas, in the presence of such as salt, the solution remains clear.

Hence, in accordance with the invention, the zeolite is exchanged with the zinc in the presence of a complexing agent for zinc such that, in the presence of stoichiometric amounts, between 1% and 30% of free $Zn^{2+}$ ions remain with respect to the total amount of zinc components, in a pH region preferentially of greater than 6.5.

The exchange can be carried out by soaking or by percolation.

It should be noted that this exchange with zinc can be preceded or followed by another exchange, for example with lithium cations.

The present invention is not limited to a solution comprising zinc cations and its use in a process for the manufacture of a zeolite employing one or more stages of exchange of the zeolite with zinc cations but also applies to any aqueous solution comprising one or more other metals different from zinc but causing problems analogous to those of zinc, in particular problems of precipitations in solution.

What is claimed is:

1. Aqueous solution for use in an ion-exchange process, the solution having a pH greater than 5 and comprising metal cations of at least one metal and at least one complexing agent for completing said metal cations, and wherein the proportion of free metal cations in solution represents from 0.1% to 99% of the total amount of said metal in said solution.

2. The solution according to claim 1, wherein the proportion of free metal cations in solution represents from 0.1% to 50% of the total amount of said metal in said solution.

3. The solution according to claim 1, wherein the pH is greater than 6.

4. The solution according to claim 1, wherein the total concentration of said metal is at least 0.02 M.

5. The solution according to claim 1, wherein the proportion of free metal cations in solution represents from 1% to 30% of the total amount of said metal; the pH is greater than or equal to 6.5; and the total concentration of said metal is at least 0.05 M.

6. The solution according to claim 1, wherein the metal cations are divalent cations selected from the group consisting of alkaline earth metal, transition metal, lanthanide cations, and mixtures thereof.

7. The solution according to claim 1, wherein the metal cations are in a soluble salt form.

8. The solution according to claim 1, wherein the metal cations are zinc, nickel or calcium cations.

9. The solution according to claim 1, wherein the complexing agent is an acid according to the Lewis or Brönstedt definition or a salt of such an acid, optionally at least partially dissociated into ions in solution.

10. The solution according to claim 1, wherein the complexing agent is citric acid or a mono-, di- or trisodium salt of citric acid.

11. The solution according to claim 1, wherein the stoichiometric ratio of the proportion (m) of metal cations to the proportion (n) of the complexing agent is m:n, with $m \geq 1$ or $n \geq 1$; the ratio m/n being between 0.5 and 3.

12. An ion-exchange process, which comprises contacting an adsorbent material with at least one aqueous solution according to claim 11, said solution having a pH greater than 5 and comprising metal cations of at least one metal and at least one complexing agent for complexing said metal cations; wherein the proportion of free metal cations in solution represents from 0.1% to 99% of the total amount of said metal in said solution, so as to bring about incorporation, by ion exchange, of at least a portion of the metal cations in said adsorbent.

13. The ion-exchange process according to claim 12, wherein the incorporation by ion exchange is carried out by soaking or by percolating the adsorbent with said solution.

14. The ion-exchange process according to claim 12, wherein the adsorbent is at least one zeolite, agglomerated with at least one binder.

15. The ion-exchange process according to claim 12, wherein the adsorbent is at least one zeolite of faujasite X or A.

16. The ion-exchange process according to claim 12, wherein the adsorbent is a zeolite X having a Si/Al ratio of 1 to 1.25.

17. The ion-exchange process according to claim 12, wherein he adsorbent material is contacted with the aqueous solution at a temperature between 5° C. and 120° C.

18. The ion-exchange process according to claim 12, wherein the adsorbent is also exchanged with cations of at least one second metal.

19. The ion-exchange process according to claim 12, wherein the second metal comprises lithium cations.

20. Adsorbent in agglomerated form obtained by a process according to claim 12, and which comprises metal cations of zinc.

21. Process for the separation or purification of a gas mixture by adsorption, which comprises contacting said gas mixture with particles of adsorbent according to claim 20, said adsorption process being a PSA, TSA or VSA process.

22. The adsorption process according to claim 21, wherein said process employs at least one adsorber with radial geometry.

23. The adsorption process according to claim 21, wherein the gas mixture is chosen from:

a gas mixture comprising nitrogen and oxygen;

a gas mixture comprising at least one of hydrogen and carbon monoxide;

a gas mixture comprising at least one hydrocarbon; and a gas mixture comprising at least one of carbon dioxide and water vapor.

24. Particles of zeolite X or A in agglomerated form, said zeolite being exchanged with zinc cations according to a process according to claim 12, further comprising at least one of lithium and calcium cations, and optionally comprising from 0.5 to 30% by weight of a clay binder.

25. Process or the manufacture of an adsorbent comprised of zeolite particles, employing at least one stage of ion exchange during which the adsorbent is brought into contact with al least one aqueous solution according to claim 1, said solution having a pH greater than 5 and comprising, in addition, metal cations of at least one metal and at least one complexing agent for complexing said metal cations, so as to bring about incorporation, by ion exchange, of at least a portion of the metal cations in said adsorbent.

* * * * *